United States Patent
Walberg et al.

(10) Patent No.: US 12,446,950 B2
(45) Date of Patent: Oct. 21, 2025

(54) MEDICAL INSTRUMENT

(71) Applicant: Aesculap AG, Tuttlingen (DE)

(72) Inventors: Erik Walberg, Tuttlingen (DE);
Patrick Heizmann, Huefingen (DE)

(73) Assignee: Aesculap AG, Tuttlingen (DE)

( * ) Notice: Subject to any disclaimer, the term of this patent is extended or adjusted under 35 U.S.C. 154(b) by 657 days.

(21) Appl. No.: 17/844,015

(22) Filed: Jun. 19, 2022

(65) Prior Publication Data
US 2022/0313351 A1    Oct. 6, 2022

Related U.S. Application Data

(63) Continuation of application No. PCT/EP2020/086698, filed on Dec. 17, 2020.

(30) Foreign Application Priority Data

Dec. 20, 2019   (DE) ..................... 10 2019 135 513.3

(51) Int. Cl.
*A61B 18/12* (2006.01)
*A61B 18/14* (2006.01)
*A61B 18/00* (2006.01)

(52) U.S. Cl.
CPC ..... *A61B 18/1445* (2013.01); *A61B 2018/00958* (2013.01); *A61B 2018/1455* (2013.01)

(58) Field of Classification Search
CPC ... A61B 17/29; A61B 17/295; A61B 18/1445; A61B 2018/00404; A61B 2018/0063; A61B 2018/00958; A61B 2018/1455
See application file for complete search history.

(56) References Cited

U.S. PATENT DOCUMENTS

| | | | |
|---|---|---|---|
| 7,204,836 B2 * | 4/2007 | Wagner | A61B 17/29 606/205 |
| 2001/0037108 A1 * | 11/2001 | Blocher | A61B 18/12 606/39 |
| 2008/0015566 A1 | 1/2008 | Livneh | |
| 2012/0271346 A1 * | 10/2012 | Townsend | A61B 17/29 606/205 |
| 2013/0218159 A1 * | 8/2013 | Kappel | A61B 17/3201 606/174 |

(Continued)

FOREIGN PATENT DOCUMENTS

| | | |
|---|---|---|
| DE | 69724040 | 6/2004 |
| EP | 0812572 B1 | 8/2003 |
| EP | 3305223 A1 | 4/2018 |

*Primary Examiner* — Daniel W Fowler
(74) *Attorney, Agent, or Firm* — Christopher A. Rothe; CM Law

(57) ABSTRACT

A medical instrument with a distal and a proximal end. A first tool element and a second tool element are arranged or formed on the distal end so as to be movable relative to one another. The tool elements define a tool element direction of extent from proximal to distal. The first tool element defines a first tool element face and the second tool element defines a second tool element face. The first tool element face and the second tool element face face toward one another. The tool elements define in the region of their tool element faces a width. The widths extend in a direction transverse to the tool element direction of extent and transverse to a surface normal of the first tool element face and/or the second tool element face.

15 Claims, 9 Drawing Sheets

(56) References Cited

U.S. PATENT DOCUMENTS

Figure 1:
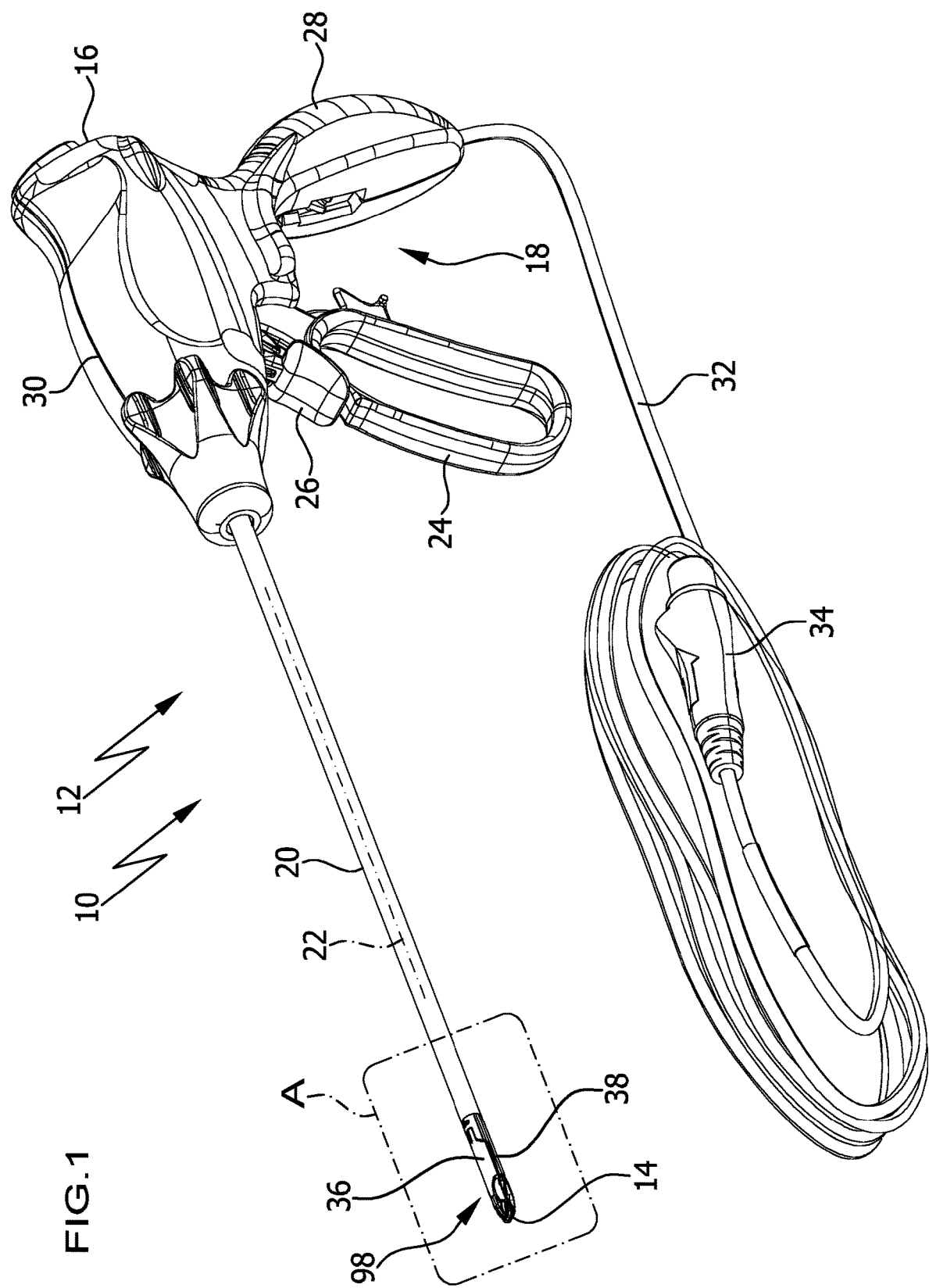

| | | | |
|---|---|---|---|
| 2014/0094801 A1* | 4/2014 | Boudreaux | A61B 18/1445 606/51 |
| 2014/0236152 A1* | 8/2014 | Walberg | A61B 18/1445 606/52 |
| 2017/0056038 A1 | 3/2017 | Hess et al. | |
| 2018/0360525 A1* | 12/2018 | Batchelor | A61B 18/1445 |
| 2019/0282256 A1 | 9/2019 | Dunn | |

* cited by examiner

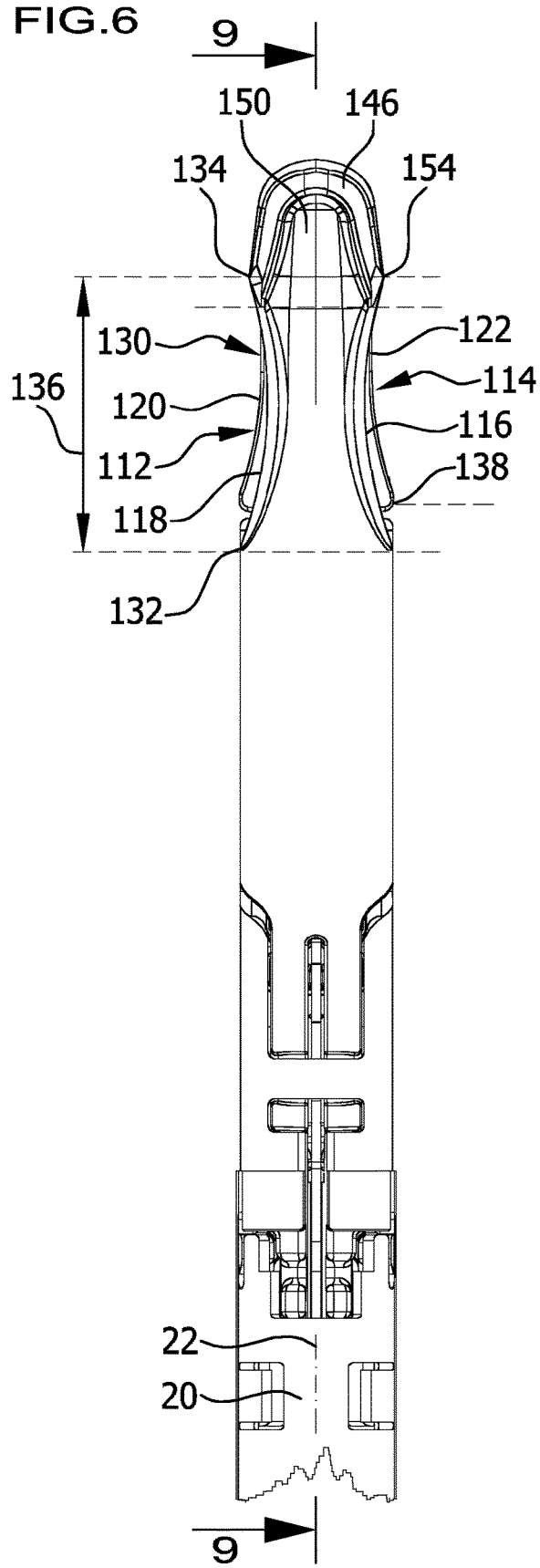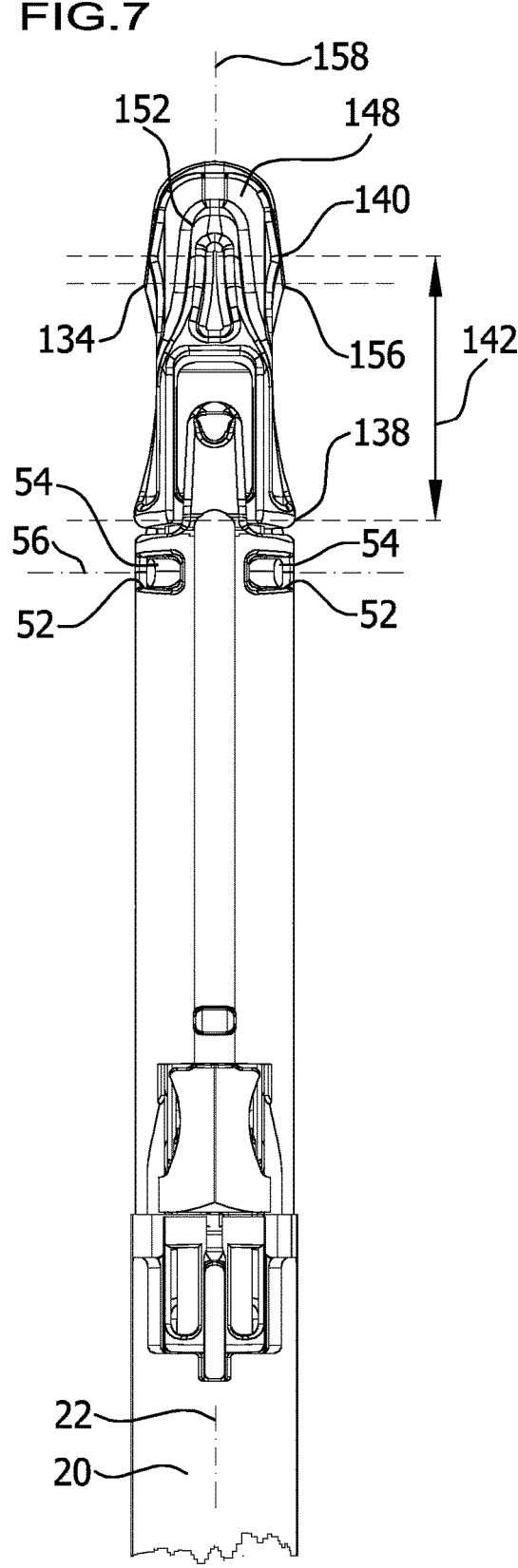

MEDICAL INSTRUMENT

CROSS-REFERENCE TO RELATED APPLICATIONS

This application is a continuation of international application number PCT/EP2020/086698 filed on Dec. 17, 2020 and claims priority to German application number 10 2019 135 513.3 filed on Dec. 20, 2019. The contents of international application number PCT/EP2020/086698 and German application number 10 2019 135 513.3 are incorporated herein by reference in their entirety and for all purposes.

FIELD

The present invention relates to medical instruments generally, and more specifically to a medical instrument with a distal and a proximal end, wherein a first tool element and a second tool element are arranged or formed on the distal end so as to be movable relative to one another, wherein the tool elements define a tool element direction of extent from proximal to distal, wherein the first tool element defines a first tool element face and the second tool element defines a second tool element face, wherein the first tool element face and the second tool element face face toward one another, wherein the tool elements define in the region of the tool element faces a width, which extends in a direction transverse, in particular perpendicular, to the tool element direction of extent and transverse, in particular perpendicular, to a surface normal of the first tool element face and/or the second tool element face, and wherein the first tool element and/or the second tool element has at least one gripping element with a gripping face facing away from the respective tool element.

BACKGROUND

It is known to equip medical instruments with two tool elements, which can be moved, in particular displaced and/or pivoted, relative to one another to form an instrument mouth, the tool element direction of extent in the case of these instruments running not rectilinearly, but rather curvedly. Distal ends of medical instruments curved in that way, which are formed by the curved tool elements, also referred to as mouth parts, provide a user, in particular, an improved visibility of the distal end of the instrument as well as improved preparation properties. For example, due to its curved mouth parts, the instrument can also be used as a kind of lateral hook in order to better grip tissue and vessels and to then, e.g., position same between the tool element faces of the tool elements.

Instruments with tool elements that define a rectilinear tool element direction of extent do not have such advantageous properties.

SUMMARY

In a first aspect of the invention, a medical instrument has a distal and a proximal end. A first tool element and a second tool element are arranged or formed on the distal end so as to be movable relative to one another. The tool elements define a tool element direction of extent from proximal to distal. The first tool element defines a first tool element face and the second tool element defines a second tool element face. The first tool element face and the second tool element face face toward one another. The tool elements define in the region of their tool element faces a width, which extends in a direction transverse, in particular perpendicular, to the tool element direction of extent and transverse, in particular perpendicular, to a surface normal of the first tool element face and/or the second tool element face. The first tool element and/or the second tool element has at least one gripping element with a gripping face facing away from the respective tool element. The width of the first and/or second tool element decreases commencing from the proximal end thereof toward the distal end thereof. The width has at least one local minimum between the proximal and the distal end. The gripping face is formed in the region of the local minimum of the width.

In a second aspect of the invention, a medical instrument has a distal and a proximal end. A first tool element and a second tool element are arranged or formed on the distal end so as to be movable relative to one another. The tool elements define a tool element direction of extent from proximal to distal. The first tool element defines a first tool element face and the second tool element defines a second tool element face. The first tool element face and the second tool element face face toward one another. The tool elements define in the region of their tool element faces a width, which extends in a direction transverse, in particular perpendicular, to the tool element direction of extent and transverse, in particular perpendicular, to a surface normal of the first tool element face and/or the second tool element face. The first tool element and/or the second tool element has at least one gripping element with a gripping face facing away from the respective tool element. The width of the first and/or second tool element decreases commencing from the proximal end thereof toward the distal end thereof. The width has at least one local minimum between the proximal and the distal end. The gripping face is formed in the region of the local minimum of the width. The first tool element and/or the second tool element comprises a plate-shaped tool element region and the tool element face is formed on the plate-shaped tool element region of the respective tool element.

In a third aspect of the invention, a medical instrument has a distal and a proximal end. A first tool element and a second tool element are arranged or formed on the distal end so as to be movable relative to one another. The tool elements define a tool element direction of extent from proximal to distal. The first tool element defines a first tool element face and the second tool element defines a second tool element face. The first tool element face and the second tool element face face toward one another. The tool elements define in the region of their tool element faces a width, which extends in a direction transverse, in particular perpendicular, to the tool element direction of extent and transverse, in particular perpendicular, to a surface normal of the first tool element face and/or the second tool element face. The first tool element and/or the second tool element has at least one gripping element with a gripping face facing away from the respective tool element. The width of the first and/or second tool element decreases commencing from the proximal end thereof toward the distal end thereof. The width has at least one local minimum between the proximal and the distal end. The gripping face is formed in the region of the local minimum of the width. The at least one gripping element has a further gripping face and the further gripping face is inclined in relation to the tool element face of the respective tool element.

BRIEF DESCRIPTION OF THE DRAWING FIGURES

Figure 2:
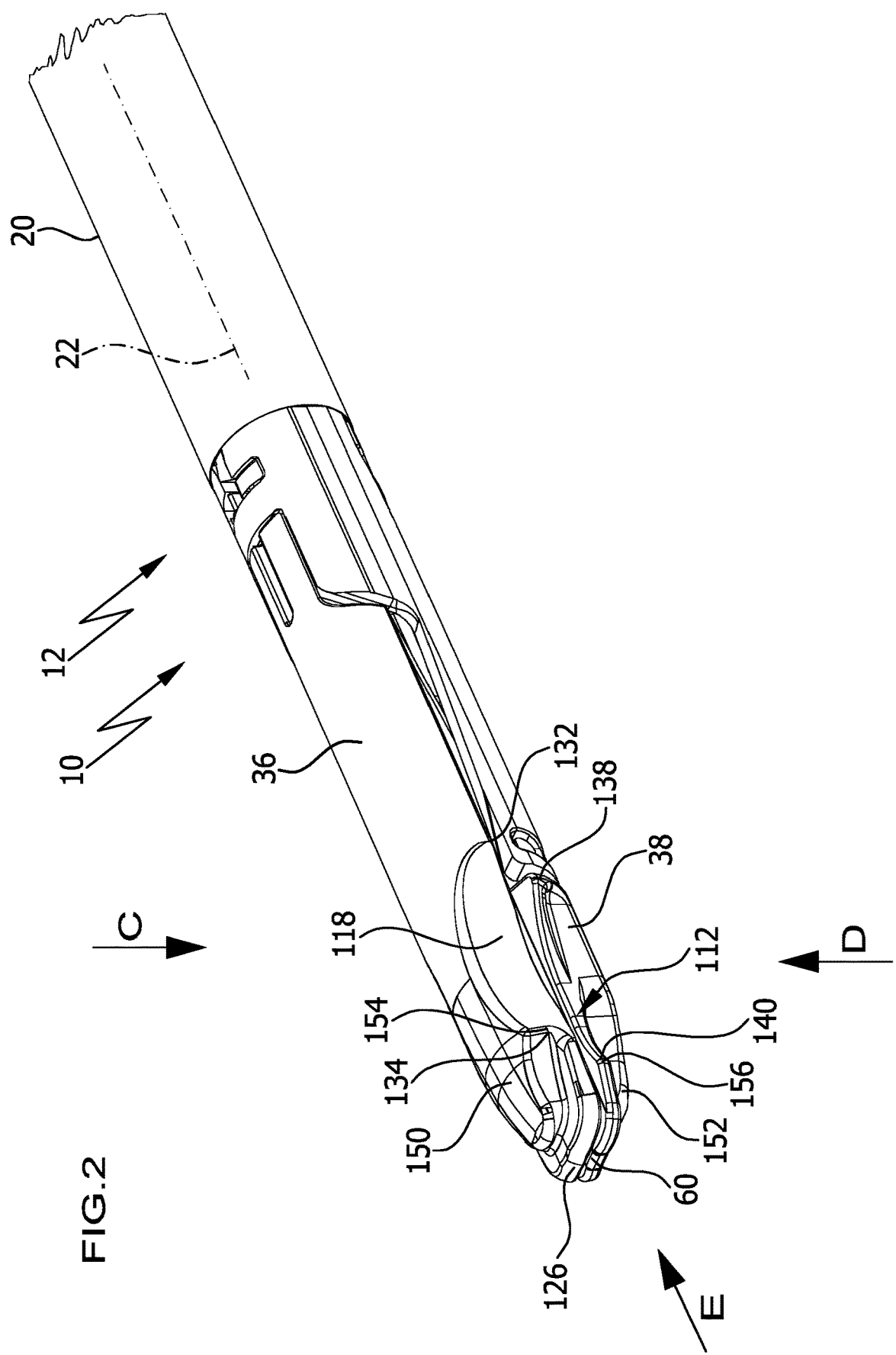
Figure 3:
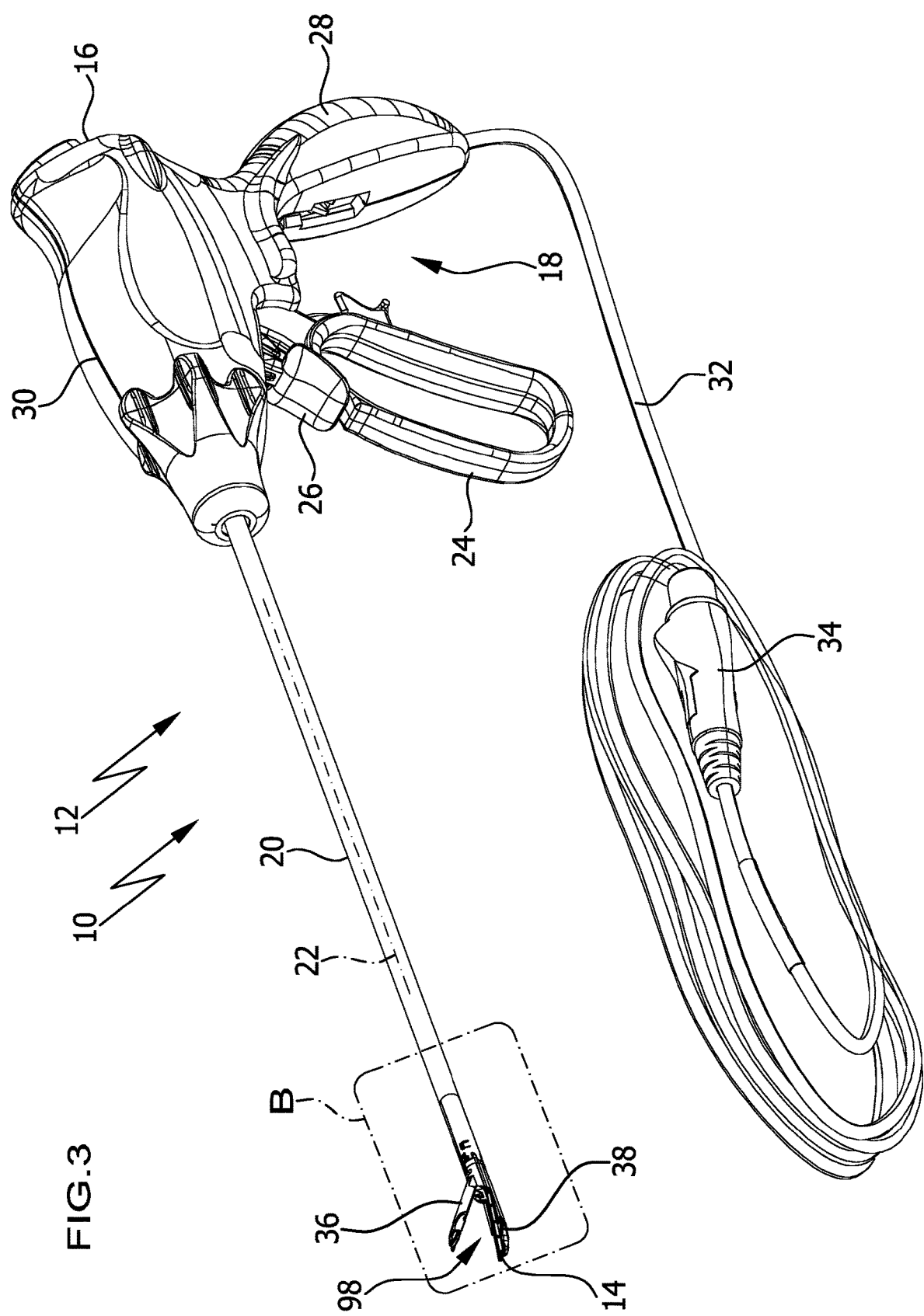
Figure 4:
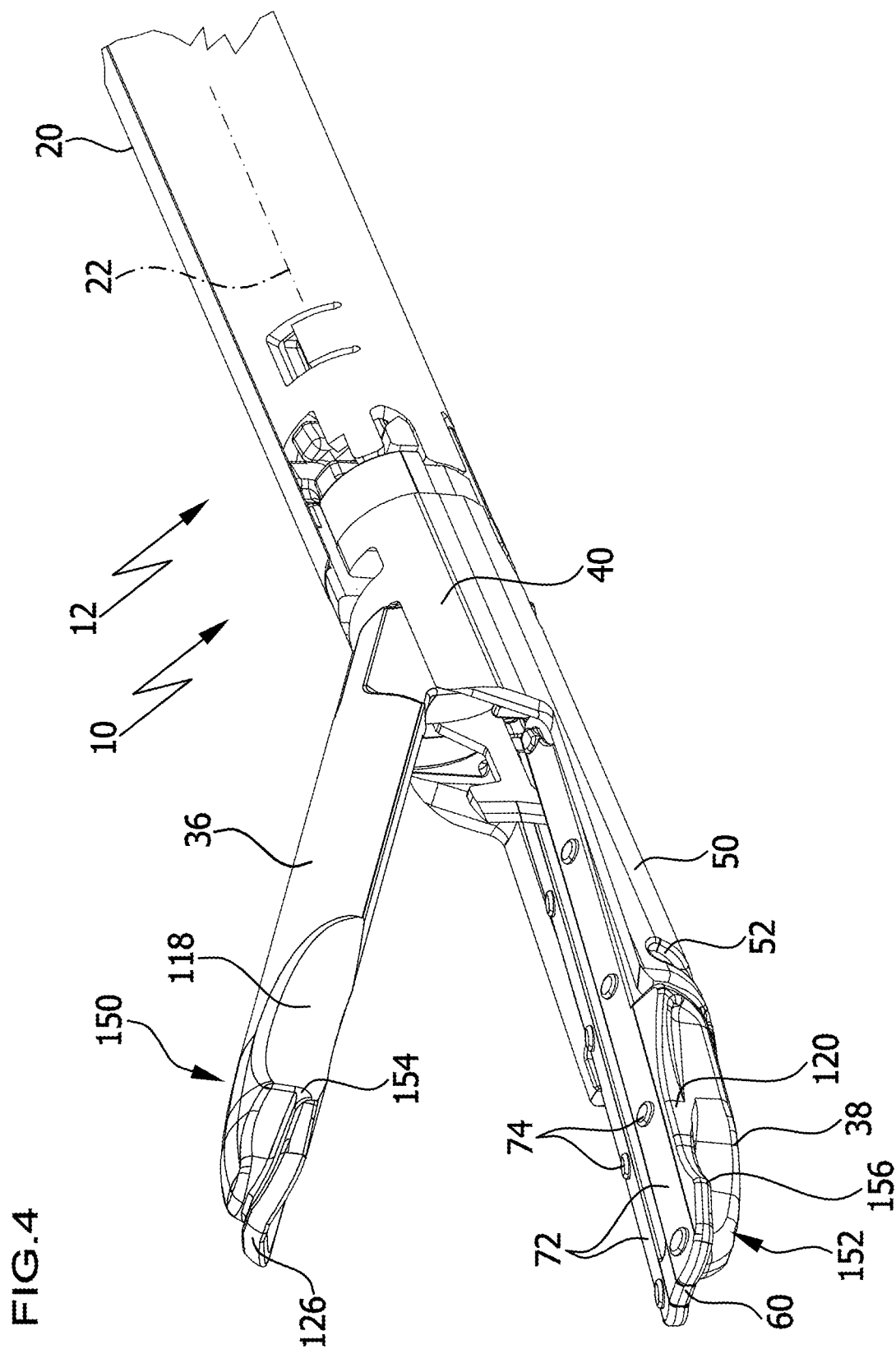
Figure 5:
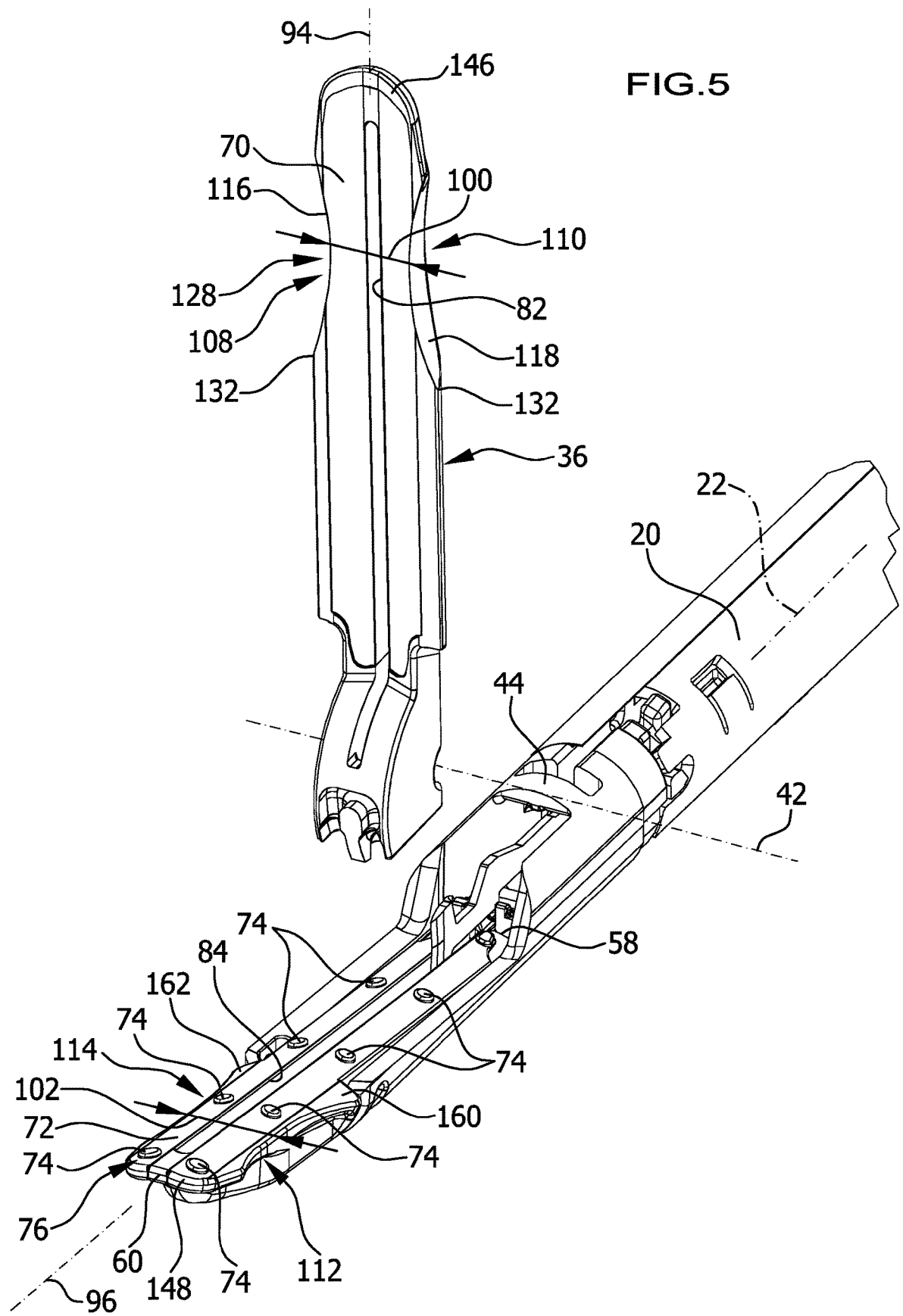
Figure 8:
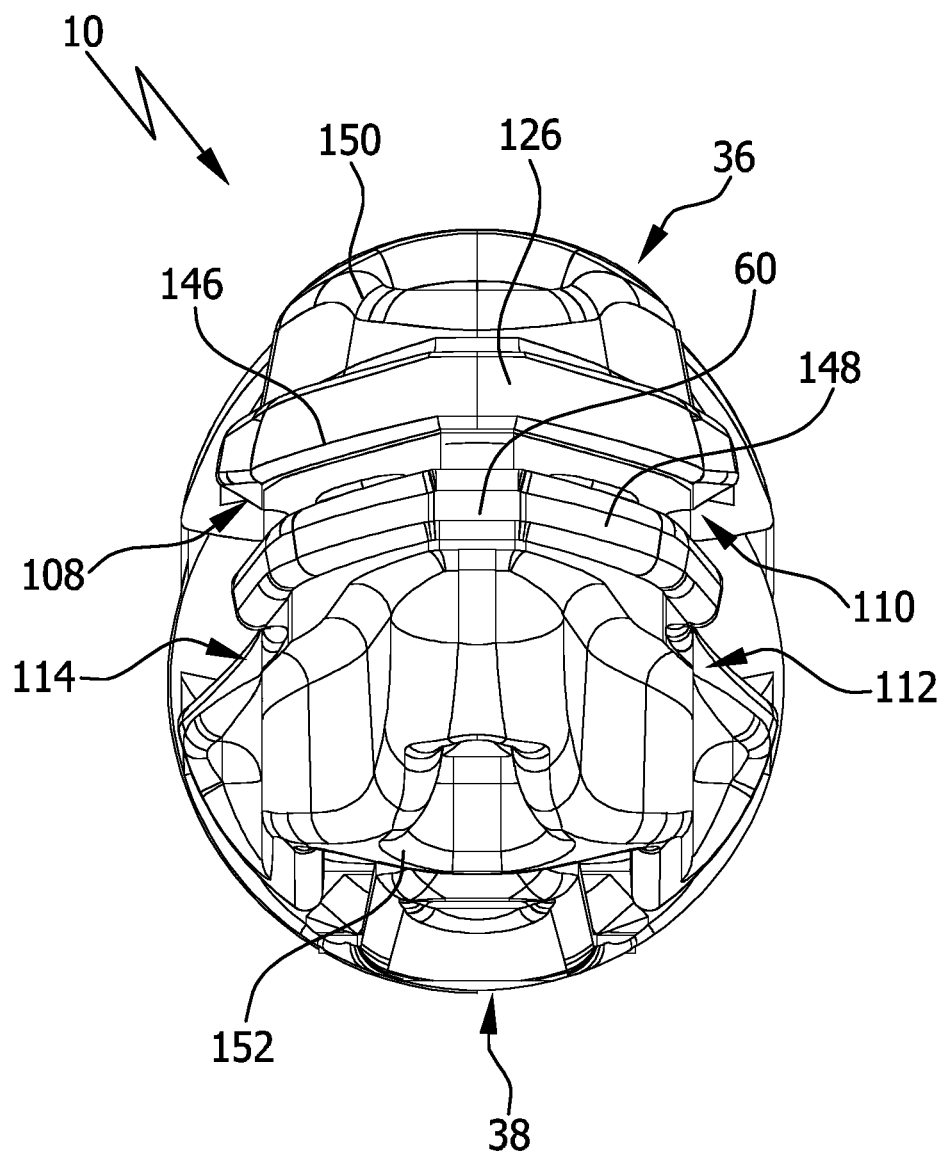
Figure 9:
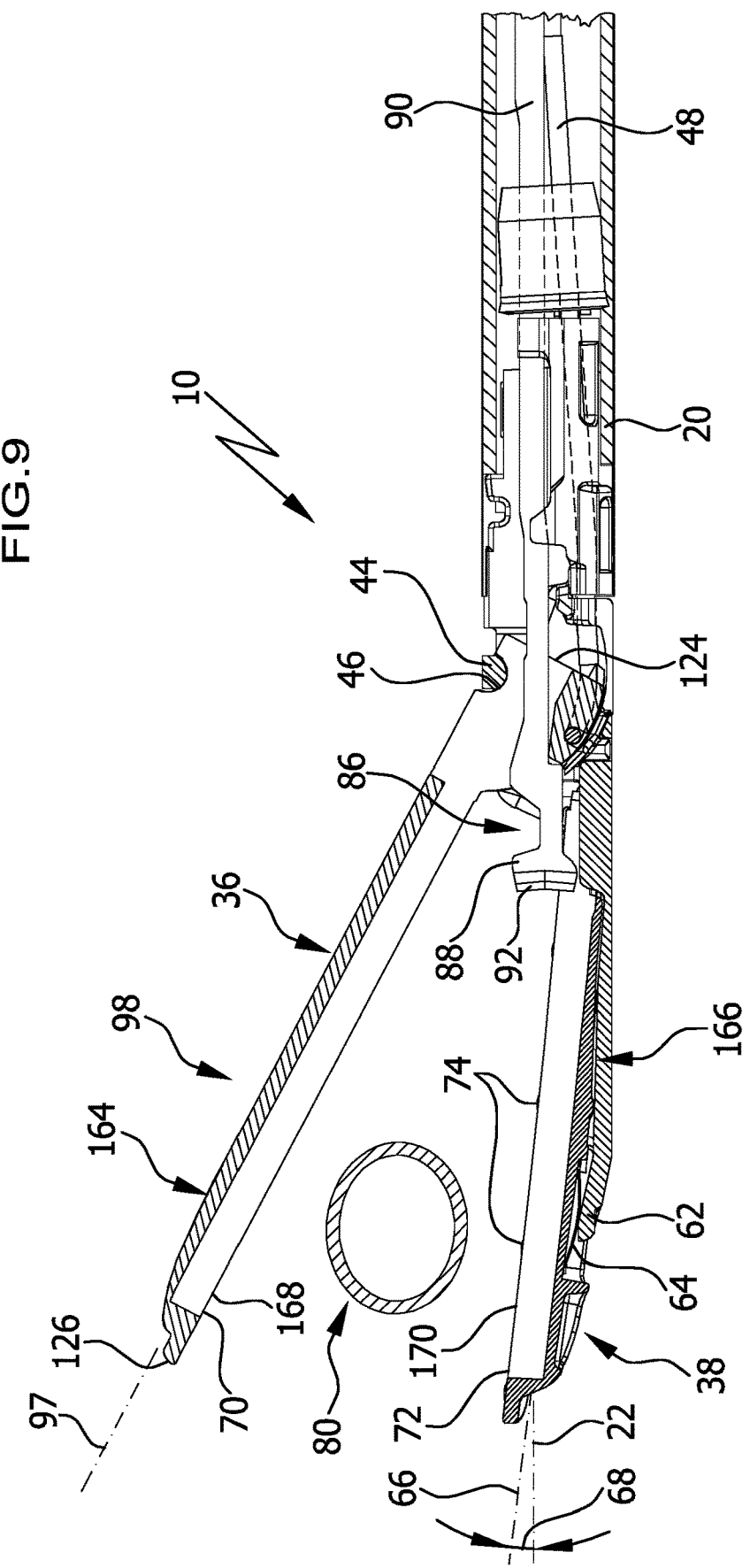
Figure 10:
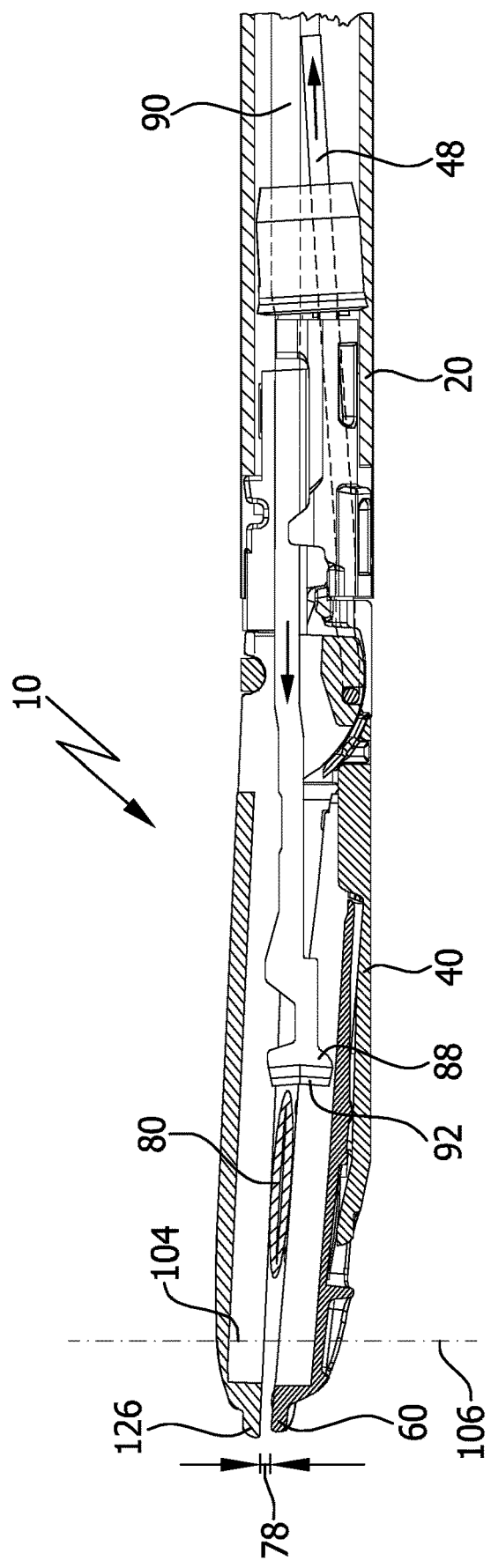

The foregoing summary and the following description may be better understood in conjunction with the drawing figures, of which:

FIG. 1: shows a perspective total view of an embodiment of a medical instrument;

FIG. 2: shows an enlarged partial view of the region A in FIG. 1;

FIG. 3: shows a view similar to FIG. 3 but with the instrument mouth opened;

FIG. 4: shows an enlarged partial view of the region B from FIG. 3;

FIG. 5: shows a perspective partially exploded depiction of the arrangement from FIG. 4;

FIG. 6: shows a view of the arrangement from FIG. 2 in the direction of the arrow C;

FIG. 7: shows a view of the arrangement from FIG. 2 in the direction of the arrow D;

FIG. 8: shows a view of the arrangement from FIG. 2 in the direction of the arrow E;

FIG. 9: shows a cut view along line 9-9 in FIG. 6 with the mouth opened; and FIG. 10: shows a cut view along line 9-9 in FIG. 6 with the mouth closed.

DETAILED DESCRIPTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a medical instrument with a distal and a proximal end, wherein a first tool element and a second tool element are arranged or formed on the distal end so as to be movable relative to one another, wherein the tool elements define a tool element direction of extent from proximal to distal, wherein the first tool element defines a first tool element face and the second tool element defines a second tool element face, wherein the first tool element face and the second tool element face face toward one another, wherein the tool elements define in the region of their tool element faces a width, which extends in a direction transverse, in particular perpendicular, to the tool element direction of extent and transverse, in particular perpendicular, to a surface normal of the first tool element face and/or the second tool element face, and wherein the first tool element and/or the second tool element has at least one gripping element with a gripping face facing away from the respective tool element, wherein the width of the first and/or second tool element decreases commencing from the proximal end thereof toward the distal end thereof, wherein the width has at least one local minimum between the proximal and the distal end, and wherein the gripping face is formed in the region of the local minimum of the width.

The proposed further development of known medical instruments has the advantage, in particular, that the advantageous properties of curved mouth pieces can also be achieved with rectilinearly extending mouth parts. It is also possible, in particular, to form rectilinearly extending mouth parts with gripping elements on both sides, which form corresponding gripping faces. In particular, it is possible to provide one or two or even more gripping elements only on the first tool element or only on the second tool element. However, one, two, or more, for example three or four, gripping elements may also be arranged or formed on both tool elements. Such an instrument can thus be used for fine preparations. In other words, a fine preparation property can thus be achieved with conventional instruments. In addition, the visibility of a distal instrument tip is also improved, because, in particular, the at least one local minimum of the width on the at least one tool element is easily visible.

The handleability of tissue and vessels with the medical instrument can be further improved, in particular, by the first tool element and/or the second tool element comprising two gripping elements. A surgeon thus has a plurality of options to prepare tissue and, for example, retain tissue with the two gripping elements of the one and/or of the other tool element.

A further improvement of the handling of the medical instrument for preparing tissue and vessels can be achieved, in particular, by the two gripping elements each defining a gripping face, which are arranged or formed in the region of the local minimum of the width and facing away from one another. Thus, for example, in the case of rectilinearly extending tool elements or mouth parts, a gripping element with a respective gripping face can be arranged or formed on both sides. A hook function can thus be achieved on both sides with the tool elements. This is possible only on one side in the case of curved mouth parts. This is also not possible with rectilinearly extending tool elements that do not have the property of the width having a local minimum. With tool elements of that kind, tissue always slides in the distal direction onto and off the tool elements. With such instruments, it is not possible to retain tissue or vessels in a defined manner and to prevent or at least hinder same from slipping off.

It is advantageous if the gripping face faces away from the tool element direction of extent. In other words, the gripping face can thus face laterally away from the respective tool element.

It is favorable if the first tool element and the second tool element are configured in the form of clamping elements and if the first tool element face and the second tool element face are configured in the form of clamping faces. A medical instrument equipped in that way can be used, e.g., as gripping forceps or as a bipolar sealing instrument.

A hook function can be achieved in a simple manner with the tool elements of the instrument, for example, by the gripping face of the at least one tool element being concavely curved facing away from the respective tool element. Such a configuration makes it possible, in particular, to achieve a form of the tool elements that diverges in the distal direction, i.e., a hook-like shape, even in the case of a rectilinear extent of the tool elements, with which tissue and vessels can be retained and prepared in a simple and desired manner.

The instrument can be formed in a simple and compact manner, in particular, if the at least one gripping element comprises a partial region of a side face of the respective tool element. The gripping element can thus, in particular, be formed in one piece with the tool element and be integrated therein.

In accordance with a further preferred embodiment, provision may be made that the first tool element and/or the second tool element comprise a plate-shaped tool element region and that the tool element face is formed on the plate-shaped tool element region of the respective tool element. Such a plate-shaped tool element region has, in particular, a thickness in the direction of the surface normal of the respective tool element face. This thickness is significantly smaller, in particular smaller than 50%, in comparison to the width on the one hand and to the extent of the tool element in the tool element direction of extent on the other hand and thus enables, in particular, the formation of a contour particularly suited for the preparation of tissue, which may be of pusher-like and, in particular, blunt configuration, in order to separate tissue layers from one another. A thickness of the tool element overall may, in particular, be significantly larger than a thickness of the plate-shaped tool element region. In particular, the plate-shaped tool element region may be configured in the form of a flange-like region at least partially forming a rim of the tool element, with which tissue can be prepared in the distal direction and on both sides of the tool element direction of extent. Forming a plate-shaped tool element region on one of the two tool elements or on both tool elements has the advantage, for example, that a movement of the two tool elements relative to one another enables, in particular, a blunt, i.e., atraumatic tissue preparation by spreading tissue.

It is advantageous if the plate-shaped tool element region defines the side face of the respective tool element. A very narrow, hook-shaped gripping face can thus be formed by the side face of the thin plate-shaped tool element region. Tissue can thus be retained in a particularly simple and secure manner.

It is advantageous if the distal end of the respective tool element is formed by the plate-shaped tool element region. The tip can thus be inserted between tissue layers in a simple manner and with little effort in order to separate said tissue layers from one another.

In order to, in particular, improve the stability of the tool elements, it is favorable if the plate-shaped tool element region bears a support structure on a side facing away from the respective tool element face. The support structure may, in particular, have an extent in the direction of the thickness of the plate-shaped tool element region that exceeds the thickness by a multiple of its extent.

In order to, in particular, be able to form a distal end region of the tool element by means of the plate-shaped tool element region, it is advantageous if the support structure is recessed in the proximal direction in relation to the distal end of the tool element. Further, it may also optionally be recessed laterally in relation to the side faces of the plate-shaped tool element region. Thus, a preparation element, in particular a blunt preparation element, can be formed in the distal direction and optionally on one or both sides of the tool elements in order to sever and prepare tissue.

In order to prevent damage to tissue, it is advantageous if the gripping face of the at least one gripping element is curved in a tangentially continuous manner.

It is advantageous if the width has at least one local maximum between the proximal and the distal end and if the gripping face extends in the distal direction up to the local maximum. Thus, in particular, a hook-shaped gripping face can be formed on the respective tool element on one and/or both sides, with which gripping face tissue and vessels can be retained in a simple manner.

The width advantageously decreases continuously in the distal direction commencing from the local maximum. In particular, it may decrease continuously up to the distal end. In this case then, the tool element is wider, for example more than 50% wider, in the region of the local maximum than in the region of the local minimum of the width offset in the proximal direction.

It is favorable if a distance of the local minimum of the width from a proximal end of the gripping face is greater than from a distal end of the gripping face. This configuration makes it possible, in particular, to form the hook function of the tool elements as far in the distal direction of the instrument as possible. Tissue can thus, in particular, be prepared as described with a tip of the instrument or in a region near the tip of the instrument.

Further, it may be advantageous if the two gripping elements are arranged or formed symmetrically on the respective tool element. In particular, a handling of the instrument can thus be further improved for the surgeon. The surgeon can thus prepare and hold tissue freely and nearly unrestrictedly in two opposing directions, independently of an orientation of the tool elements in relation to the tool element direction of extent.

The instrument can be formed in a simple and cost-effective manner if the first and/or the second tool element are of mirror-symmetrical configuration with respect to a mirror plane containing the longitudinal axis of the respective tool element defining the tool element direction of extent.

To be able to securely and sensitively prepare and hold tissue during a surgical procedure in the human or animal body, it is favorable if a curvature of the gripping face of the at least one gripping element defines a radius of curvature in a range of about 5 mm to about 30 mm. In particular, the radius of curvature may be about 15 mm. Gripping faces curved in that way are outstandingly suitable for the preparation and retention of tissue.

In accordance with a further preferred embodiment, provision may be made that the gripping face of the at least one gripping element on the first tool element and the gripping face of the at least one gripping element on the second tool element are arranged or formed overlapping in the tool element direction of extent or offset from one another in the distal or proximal direction. The tool elements with their gripping elements that define the gripping faces can thus be configured in different ways and thereby optimized for different preparation purposes. In particular, an offset arrangement makes it possible, for example in the case of tool elements moved away from one another, to hold tissues at different distances from one another in the tool element direction of extent.

The at least one gripping element is preferably molded or formed in one piece on the respective tool element. This enables a particularly simple production of the instrument, in particular the tool elements.

It may also be favorable, however, if the at least one gripping element is configured to be releasably connectable to the respective tool element. Gripping elements can thus, for example, be exchanged as necessary in order to be able to use instruments in an optimized manner in different surgical procedures. Further, gripping elements can be retrofitted to the tool elements if the latter are correspondingly configured. If gripping elements are not required, they can be removed from the tool elements.

The instrument can be configured in a simple manner if the at least one gripping element and the associated tool element are in force-locking and/or positive-locking engagement in a connecting position. In particular, a releasable connectivity between gripping element and tool element can thus be achieved in a simple manner.

It is favorable if the at least one gripping element is arranged or formed closer to the distal end than to the proximal end of the respective tool element. Thus, for example, a retaining or hook function of the gripping element can be achieved further distally on the instrument.

It is advantageous if the gripping face of the at least one gripping element extends transversely, in particular perpendicularly, to the tool element face of the respective tool element. A hook or retaining function can thus be achieved in a direction running transversely to a tool element direction of extent that the tool elements specify.

In accordance with a further preferred embodiment, provision may be made that the at least one gripping element has a further gripping face and that the further gripping face is inclined in relation to the tool element face of the respective tool element. By means of this configuration, preparation properties of the medical instrument can be further improved in a simple manner.

It is advantageous if, in a maximally proximate position of the at least two tool elements, a distance of the first tool element face and the second tool element face from one another is constant or substantially constant. For example, an electrosurgical instrument in which the two tool element faces are not permitted to contact one another to avoid a short circuit can thus be achieved in a simple manner.

The instrument favorably comprises a spacer device for specifying a minimum distance of the at least two tool elements from one another in the maximally proximate position. By means of such a spacer device, the tool element faces of the tool elements can be simply and securely prevented from contacting one another.

It is advantageous if the spacer device comprises at least one spacer element, which is arranged or formed projecting from the first tool element face or from the second tool element face. For example, one or more spacer elements may project from each of the tool element faces. The spacer elements are favorably electrically non-conductive components.

The at least one spacer element is preferably made of an electrically insulating material. For example, said material may be a ceramic. Electrically insulating in this sense means, in particular, non-conductors with a conductivity in the range of about $10^{-8}$ to over $10^{-26}$ S/cm. A ceramic may be applied, in particular, in a simple manner to a tool element made of a metallic, electrically conductive material.

The at least two tool elements are preferably made of an electrically conductive material. In particular, it may be a metallic conductor. Such a metallic conductor has, in particular, an electrical conductivity of at least $10^6$ S/m.

The tool elements can be configured in a simple manner and have any shape if the at least two tool elements are configured in the form of metal injection molded parts. For example, they can be produced by means of a so-called MIM process. MIM stands for "Metal Injection Molding".

In accordance with a further preferred embodiment, provision may be made that the first tool element face and the second tool element face are of planar configuration. Alternatively, the first tool element face and the second tool element face may be of curved configuration, in particular concavely on the one hand and convexly corresponding thereto on the other hand in relation to the tool element direction of extent. Thus, in particular, tool elements can be formed that, in a maximally proximate position, have a constant minimum distance from one another, namely independently of whether the tool element faces are planar or curved.

It is advantageous if the first tool element and the second tool element each have a slit extending in the tool element direction of extent, which slit passes through the first tool element face and the second tool element face at least in sections. Such a slit may be used, in particular, to guide a cutting element of a cutting device during a movement coming from proximal in the distal direction in order to sever tissue that is held between the tool element faces and joined by coagulation. Thus, for example, vessels can be sealed and severed in a single step.

The tool elements can be formed in a simple manner if the slit is shaped like an oblong hole. In particular, the slit may extend rectilinearly, even if the tool element direction of extent runs in a curved manner.

For severing tissue, it is favorable, in particular, if the instrument comprises a cutting device with a cutting element, which is arranged or formed so as to be movable in the tool element direction of extent. Interconnected tissue can thus be severed with the cutting device as described.

It is favorable if the cutting element has a cutting edge pointing in the distal direction and if the cutting edge at least partially passes through the slits in the tool elements when the tool elements adopt the maximally proximate position. It can thus be ensured, in particular, that tissue held between the tool element faces can be completely severed with the cutting element.

To be able to create instruments for various applications, it is advantageous if the tool element direction of extent extends in a rectilinear or curved manner.

To prevent tissue and vessels from being able to be damaged by the tool elements, in particular the distal ends thereof, it is advantageous if distal ends of the at least two tool elements are rounded. In particular, they may be of blunt configuration.

To be able to further improve a retaining function of the instrument, it is favorable if the gripping face of the at least one gripping element has a structured surface. In particular, the surface may be of macroscopically structured configuration. For this purpose, a multitude of projections may be formed, or a regular structure, for example in the manner of a waffle iron or a nailboard.

It is advantageous if the gripping face of the at least one gripping element is at least partially, in particular completely, provided with a coating. The coating may be formed separately and be connected to the gripping face in a force-locking and/or positive-locking manner and/or by material bond. In particular, the coating may be applied by means of a thermal coating process like, e.g., thermal spraying, chemical vapor deposition, flame-plating, physical vapor deposition, sputtering, or build-up welding. Providing the coating makes it possible, for example, to separate mechanical properties of the tool elements from surface properties by means of a targeted selection of different materials. Optionally forming the coating with a structured surface enables, in particular, an improved grip on the tissue.

The coating preferably forms the structured surface. Thus, in particular, an improved grip on the tissue can be achieved. In addition, a structuring of the surface can also be formed in a simple manner.

It is favorable if the coating is configured in the form of a thermal coating, in particular in the form of a ceramic coating. Independently of whether the coating has or forms a structured surface, in particular, the risk of thermal damage to the edge of the gripping face and thus damage to surrounding tissue and/or tissue held by the instrument can thus be reduced.

The instrument is preferably configured in the form of an electrosurgical instrument or in the form of a stapler. The use of the respective instrument can thus be further optimized by means of the gripping elements. Tissue can thus be more easily placed between the tool element faces and processed, for example stabled or electrosurgically welded by means of high-frequency currents.

In particular for minimally invasive surgical procedures, it is advantageous if the medical instrument comprises an actuating device, which is arranged or formed on a proximal end of the instrument cooperating with the tool elements for moving same relative to one another. For example, the actuating device may be coupled to the tool elements by way of a force transmission member or by way of a plurality of force transmission members, for example push and pull members, which are displaceably arranged or formed in a tubular shaft.

Further, the present invention relates to a medical instrument with a distal and a proximal end, wherein a first tool element and a second tool element are arranged or formed on the distal end so as to be movable relative to one another, wherein the tool elements define a tool element direction of extent from proximal to distal, wherein the first tool element defines a first tool element face and the second tool element defines a second tool element face, wherein the first tool element face and the second tool element face face toward one another, wherein the tool elements define in the region of their tool element faces a width, which extends in a direction transverse, in particular perpendicular, to the tool element direction of extent and transverse, in particular perpendicular, to a surface normal of the first tool element face and/or the second tool element face, and wherein the first tool element and/or the second tool element has at least one gripping element with a gripping face facing away from the respective tool element, wherein the width of the first and/or second tool element decreases commencing from the proximal end thereof toward the distal end thereof, wherein the width has at least one local minimum between the proximal and the distal end, and wherein the gripping face is formed in the region of the local minimum of the width, wherein the first tool element and/or the second tool element comprises a plate-shaped tool element region and wherein the tool element face is formed on the plate-shaped tool element region of the respective tool element.

The present invention also relates to a medical instrument with a distal and a proximal end, wherein a first tool element and a second tool element are arranged or formed on the distal end so as to be movable relative to one another, wherein the tool elements define a tool element direction of extent from proximal to distal, wherein the first tool element defines a first tool element face and the second tool element defines a second tool element face, wherein the first tool element face and the second tool element face face toward one another, wherein the tool elements define in the region of their tool element faces a width, which extends in a direction transverse, in particular perpendicular, to the tool element direction of extent and transverse, in particular perpendicular, to a surface normal of the first tool element face and/or the second tool element face, and wherein the first tool element and/or the second tool element has at least one gripping element with a gripping face facing away from the respective tool element, wherein the width of the first and/or second tool element decreases commencing from the proximal end thereof toward the distal end thereof, wherein the width has at least one local minimum between the proximal and the distal end, and wherein the gripping face is formed in the region of the local minimum of the width, wherein the at least one gripping element has a further gripping face and wherein the further gripping face is inclined in relation to the tool element face of the respective tool element.

An embodiment of a medical instrument 10 is schematically depicted in FIG. 1. It is configured in the form of an electrosurgical instrument 12.

The instrument 10 has a distal end 14 and defines a proximal end 16.

An actuating device 18 is arranged on the proximal end 16 of the instrument 10. Said actuating device 18 is arranged so as to be rotatable relative to an elongate shank 20 about a longitudinal axis 22 defined thereby.

A first lever 24 and a second lever 26 protrude from the actuating device 18 transversely to the longitudinal axis 22, which are pivotable in the proximal direction about pivot axes, which are not drawn and extend transversely to the longitudinal axis 22, in the direction toward a stationary grip element 28. The grip element 28 also protrudes transversely, nearly perpendicularly, in relation to the longitudinal axis 22 from a base body 30 of the actuating device 88.

A connecting cable 32, on the free end of which a plug connector 34 is arranged, is lead out of a free end of the grip element 28. The plug connector 34 is configured to be mechanically and electrically brought into engagement with a corresponding plug connector on a current supply device. The instrument 10 can thus be supplied with a high-frequency current.

A first tool element 36 and a second tool element 38 are arranged on the distal end 14 of the shank 20 so as to be movable, namely pivotable, relative to one another.

The first tool element 36 is mounted on a bearing element 40, which protrudes from the shank 20 on the distal side, so as to be pivotable about a pivot axis 42 extending transversely to the longitudinal axis 22. Said pivot axis 42 is defined by a transverse support 44 defining a bearing shaft, which transverse support 44 is formed on the bearing element 40 and cooperates with a trough-shaped recess 46 in the proximal end region of the first tool element 36 in order to guide the pivot movement thereof.

The first tool element 36 is coupled to the first lever 24 by way of a force transmission member 48, such that the first tool element 36 is pivoted about the pivot axis 42 in the direction toward the second tool element 38 as a result of a pivot movement of the first lever 24 in the direction toward the grip element 28.

A lower portion 50 of the bearing element 40 extends in the distal direction beyond the transverse support 44 and has two receptacles 2252 extending transversely to the longitudinal axis 22, into which bearing pins 54 projecting transversely to the longitudinal axis 22 from the second tool element 38 dip. The bearing pins 54 define a further pivot axis 56, about which the second tool element 38 is mounted so as to be pivotable in a small angular range.

The bearing pins 54 are arranged approximately in the middle between a proximal end 58 and a distal end 60 of the second tool element 38. A spring element 64, supported on the one hand on a distal end region 62 of the bearing element 40, which spring element 64 is supported with free ends on the second tool element 38, keeps the second tool element with a longitudinal axis 66 defined thereby inclined by an angle 68 of about 10° in the direction toward the first tool element in relation to the longitudinal axis 22 when the tool elements 36 and 38 are pivoted away from one another to a maximum extent.

The first tool element 36 has an elongate U-shaped first tool element face 70, which faces in the direction toward the second tool element 38. In a similar form, the second tool element 38 has an elongate U-shaped second tool element face 72, which faces in the direction toward the first tool element 36. In a maximally proximate position of the tool elements 36 and 38, the tool element faces 70 and 72 are located directly opposite one another.

Arranged on the second tool element face 72 are spacer elements 74, which form a spacer device 76 in order to specify a minimum distance 78 of the tool element faces 72 and 74 in a maximally proximate position of the tool elements 36 and 38. In the embodiment depicted in the Figures, the spacer device 76 comprises eight spacer elements 74.

The spacer elements 74 are made of an electrically non-conductive material. In the embodiment depicted in the Figures, they are made of a ceramic.

The tool elements 36 and 38 are made of an electrically conductive material. In the embodiment depicted in the Figures, the electrically conductive material is a metallic conductor.

The tool elements 36 and 38 are electrically insulated from one another. As described, the tool element faces 70 and 72 are not able to come into contact with one another due to the spacer device 76. This makes it possible, in particular, to conduct a high-frequency current via the tool elements 36 and 38 in order to, for example, coagulate and thereby seal tissue or a vessel 80 held between the tool element faces 70 and 72, as schematically depicted in the Figures, by means of the high-frequency current.

In the embodiment depicted in the Figures, the tool elements 36 and 38 are each provided with a respective slit 82 and 84, which extends in parallel to the longitudinal axis 22. The slits 82 and 84 pass through the first tool element face 70 and the second tool element face 72, respectively.

The slits 82 and 84 are shaped like an elongate hole.

The instrument 10 further comprises a cutting device 86 with a cutting element 88. Said cutting element 88 is arranged so as to be movable in parallel to the longitudinal axis 22. It is coupled to the second lever 26 by way of a force transmission member 90, which extends through the shank 20 in parallel to the first force transmission member 48.

When the second lever 26 is pivoted in the direction toward the grip element 28, the cutting element 88 with its cutting edge 92 pointing in the distal direction is moved by a movement of the force transmission member 90 in the distal direction.

The cutting edge 92 engages into the two slits 82 and 84 when the tool elements 36 and 38 adopt the maximally proximate position. This can be seen particularly well in the cut view in FIG. 10.

It should be noted here that in the embodiment depicted in the Figures, the second lever 26 can only be actuated when the first lever 24 is transferred into its position maximally proximate to the grip element 28.

The tool elements 36 and 38 each define a respective tool element direction of extent 94 and 96. In the embodiment depicted in the Figures, the tool element directions of extent 94 and 96 extend rectilinearly. They are defined by longitudinal axes 97 and 66 of the first tool element 36 and the second tool element 38.

When a mouth 98 defined by the two tool elements 36 and 38 is closed, i.e., when the two tool elements 36 and 38 adopt their maximally proximate position, the tool element directions of extent 94 and 96 and thus the longitudinal axes 97 and 66 extend in parallel to the longitudinal axis 22 of the shank 20.

The tool elements 36 and 38 define in the region of their respective tool element faces 70 and 72 a respective width 100 and 102. The width 100 extends in a direction transverse, in particular perpendicular, to the tool element direction of extent 94. The width 102 extends in a direction transverse, in particular perpendicular, to the tool element direction of extent 96.

The tool element faces 70 and 72 each define a respective surface normal 104 and 106, which are oriented perpendicularly to the tool element faces 70 and 72.

The widths 100 and 102 extend transversely, in particular perpendicularly, to the respective surface normals 104 and 106. The surface normals 104 and 106 extend in parallel to one another when the tool elements 70 and 72 adopt their maximally proximate position.

Two respective gripping elements 108, 110 and 112, 114 are arranged or formed on each of the tool elements 36 and 38.

The gripping elements 108 and 110 have gripping faces 116 and 118 facing away from the first tool element 36 and away from one another. The gripping elements 112 and 114 on the second tool element 38 define gripping faces 120 and 122 facing away from one another.

The width 100 of the first tool element 36 decreases commencing from the proximal end 124 thereof toward its distal end 126. The width 100 has at least one local minimum 128 between the proximal end 124 and the distal end 126. The width 100 is minimal in the local minimum. In other words, the tool element face 70 is narrowest here. The gripping faces 116 and 118 are formed in the region of this local minimum of the width 100.

In a similar manner, the width 102 of the second tool element 38 decreases commencing from the proximal end 58 toward the distal end 60. The width 102 has at least one local minimum 130 between the proximal and the distal end 58, 60. The gripping faces 120 and 122 are formed in the region of the local minimum of the width 130.

The gripping faces 116, 118, 120 and 122 are formed in the described manner by a sort of constriction on the tool elements 36 and 38. Thus, by their nature, hook-shaped elements are formed, namely on both sides of the tool elements 36 and 38. Tissue or vessels can be retained or pushed to the side with the gripping elements 108, 110, 112 and 114 without there being a risk that the tissue or the vessels are able to slide off the tool elements 36 and 38 in the distal direction.

The gripping faces 116 and 118 define a proximal end 132 and a distal end 134. Between said ends extends a gripping region 136 defined by the gripping faces 116 and 118.

In a similar manner, the gripping faces 120 and 122 extend between a proximal end 138 and a distal end 140 and thus define a gripping region 142.

The local minimum 128 is arranged between the ends 132 and 134, the local minimum 130 between the ends 138 and 140. The gripping faces 116, 118, 120 and 122 are thus arranged or formed in the region of the local minima 128 and 130 and facing away from one another.

The gripping faces 116, 118, 120 and 122 face away from the respective tool element direction of extent 94 and 96.

The gripping faces 116, 118, 120 and 122 are concavely curved facing away from the respective tool element 36, 38. They thus have a similar contour as if the tool elements 36 and 38 were curved on one side, their tool element directions of extent 94 and 96 thus not running rectilinearly as in the embodiment depicted in the Figures, but rather are curved from proximal to distal. One advantage in the embodiment of the medical instrument 10 depicted in the Figures compared to mouth parts curved in that way is that gripping elements 108, 110 and 112, 114 are formed on the tool elements 36 and 38, respectively, on both sides. A surgeon therefore does not have to rotate the shank 20 with the mouth 98 by 180° about the longitudinal axis 22 when they want to prepare tissue on the opposite side. Preparation and retention of tissue and vessels on both sides is possible with the described instrument 10.

In the embodiment of the instrument 10 depicted in the Figures, the gripping elements 108, 110, 112 and 114 form a partial region of a side face of the tool elements 36 and 38.

The tool elements 36 and 38 each have a plate-shaped tool element region 146 and 148 on which in each case the tool element faces 70 and 72 are formed.

In the embodiment depicted in the Figures, the plate-shaped tool element region 146 and 148 also defines the side face of the respective tool element 36 and 38.

The distal ends 126 and 60 of the tool elements 36 and 38 are also formed by the plate-shaped tool element regions 146 and 148.

The plate-shaped tool element region 146 and 148 bears a respective support structure 150 and 152 on a side facing away from the respective tool element face 70 and 72. The support structures 150 and 152 engage over, in particular, the slits 82 and 84, such that they are open only facing in the direction toward the respective other tool element 36 and 38, in order to partially accommodate the cutting element 88.

The support structures 150 and 152 are set back in the proximal direction in relation to the respective distal end 126 and 60 of the tool elements 36, 38. Thus, as can be easily seen in FIG. 9, a distal end region of the tool elements 36, 38 remains, which is formed exclusively by a short portion extending in the respective tool element direction of extent 94 and 96 that is formed exclusively by a distal end of the plate-shaped tool element regions 146 and 148. The distal end regions have a relatively small thickness in parallel to the surface normals 104 and 106, such that the distal ends 126 and 60 can be ideally used for preparing tissue. For example, they can be inserted between tissue layers in order to separate same by moving the tool elements 36 and 38 away from one another. The tissue can thus be spread and atraumatically prepared in a simple manner by a relative movement of the tool elements 36 and 38.

To prevent tissue or vessels from being able to be damaged by the instrument 10, the distal ends 126 and 60 of the tool elements 36 and 38 are rounded.

The gripping faces 116, 118, 120 and 122 are curved in a tangentially continuous manner. They thus have no corners or edges.

The width 100 and 102 of the tool elements 36 and 38, respectively, has at least one respective local maximum 154 and 156 between the respective proximal ends 124 and 58 and the respective distal ends 126 and 60. The gripping faces 108, 110, 112 and 114 extend in the distal direction up to the respective local maximum 154 and 156. The maxima 154 and 156 delimit the gripping regions 136 and 142 on the distal side.

The width 100 and 102, respectively, decreases continuously in the distal direction commencing from the local maximum, in the embodiment of the instrument 10 depicted in the Figures up to the distal ends 126 and 60 of the tool elements 36 and 38.

In the embodiment of the instrument 10 depicted in the Figures, a distance of the local minimum 128 and 130 of the respective width 100 and 102 from the respective proximal end 132 and 138 of the respective gripping face 116, 118, 120 and 122 is greater than from a distal end 134 and 140, respectively, of the respective gripping face 116, 118, 120 and 122.

In the embodiment of the instrument 10 depicted in the Figures, the gripping faces 116, 118, 120 and 122 have a structured surface. In particular, in one embodiment, the surface is macroscopically structured.

The gripping elements 108, 110 and 112, 114 are arranged or formed symmetrically on the respective tool elements 36 and 38. The tool elements 36 and 38 are mirror-symmetrically configured with respect to a mirror plane 158 containing the longitudinal axis 97 and 66 of the respective tool elements 36 and 38.

A curvature of the gripping faces 116, 118, 120 and 122 has a radius of curvature in a range of about 5 mm to about 30 mm.

The gripping faces 116, 118 and 120, 122 are arranged or formed offset from one another in the distal and proximal direction, respectively, in relation to the tool element directions of extent 94 and 96. This manifests itself, in particular, in the fact that the gripping region 142 extends somewhat further in the distal direction than the gripping region 136.

The gripping elements 108, 110, 112 and 114 are each molded or formed on the tool elements 36 and 38, namely in one piece in the sense of monolithically.

In a different embodiment of an instrument 10, the gripping elements 108, 110, 112 and 114 are releasable from the respective tool element 36 and 38. In this embodiment, a connection between the gripping elements 108, 110, 112 and 114 and the tool elements 36 and 38 is achieved by their being in force-locking and/or positive-locking engagement in a connecting position.

The gripping elements 108, 110, 112 and 114 are arranged or formed closer to the distal end 126, 66 than to the proximal end 124, 64 of the respective tool element 36 and 38.

The described gripping faces 116, 118, 120 and 122 of the gripping elements 108, 110, 112 and 114 extend transversely, in particular perpendicularly, to the respective tool element faces 70 and 72 of the tool elements 36 and 38.

In the embodiment depicted in the Figures, in particular, further gripping faces 160 and 162 are formed on the second tool element 38, which are inclined in relation to the tool element face 72 of the tool element 38. The gripping faces 160 and 162 are also formed on the gripping elements 112 and 114 and are inclined in relation to the gripping faces 120 and 122.

For an optimal functioning of the instrument 10, a distance of the tool element faces 70 and 72 in a maximally proximate position of the tool elements 36 and 38 from one another is constant or substantially constant.

The tool elements 36 and 38 form clamping elements 164 and 166. The tool element faces 70 and 72 form clamping faces 168 and 170.

In the embodiment depicted in the Figures, the tool elements 36 and 38 are configured in the form of metal injection molded parts.

In the embodiment depicted in the Figures, the tool element faces 70 and 72 are of curved configuration, namely concavely curved on the one hand and convexly curved correspondingly thereto on the other hand in relation to the respective tool element direction of extent 94 and 96.

As already described, the instrument 10 is configured in the form of an electrosurgical instrument 12. Alternative embodiments of instruments 10 are configured, e.g., in the form of staplers. In these cases, the tool elements do not have to be electrically insulated from one another. Staplers of this kind are configured, in particular, to apply surgical clips for connecting pieces of tissue.

In addition, in further embodiments of instruments that are not depicted in the Figures, the special design of the tool elements with gripping elements is, in principle, also conceivable with other instrument types. In particular, all kinds of instruments that have at least one tool element on their distal end are possibilities. The handling and preparation of tissue with the mouth 98 is thus possible in a simple manner.

This is indicated immediately and directly by the FIGS. 6 and 7 in which the gripping regions 136 and 142 are easily visible, which enable a preparation of tissue on both sides in the region of a surgical site, without the mouth 98 as a whole being curved.

Overall, tissue can be easily placed in the mouth 98 by means of the described instrument 10. In addition, the distal end 14 of the instrument is significantly more easily visible than is the case with conventional instruments, in particular due to the distinctive form of the mouth 98 that is created as a result of the described gripping elements 108, 110, 112 and 114.

The invention claimed is:

1. A medical instrument for treating tissue, the medical instrument comprising:
   an actuator at a proximal end of the medical instrument;
   a shank extending from the actuator; and
   a gripping tool extending from the shank and terminating at a distal end of the medical instrument,
   the gripping tool comprising a first tool element and a second tool element, the first tool element being pivotably movable relative to the second tool element,
   the first tool element comprising a first clamping face and the second tool element comprising a second clamping face,
   the actuator being operably connected to the gripping tool to pivot the first tool element relative to the second tool element,
   the first tool element being pivotable relative to the second tool element between an open position, in which the first clamping face is positioned away from the second clamping face, and a closed position, in which the first clamping face is closer to the second clamping face than in the open position,
   the first tool element comprising a first distal end with a first plate extending around the first distal end, and the second tool element comprising a second distal end with a second plate extending around the second distal end,
   at least one of the first plate and the second plate extending along opposing sides of the gripping tool and defining, on each opposing side, an outwardly tapered plate section, an inwardly tapered plate section that adjoins the outwardly tapered plate section, and a protuberance where the outwardly tapered plate section adjoins the inwardly tapered plate section, each protuberance projecting laterally from the gripping tool.

2. The medical instrument according to claim 1, wherein each protuberance forms a V-shaped hook.

3. The medical instrument according to claim 1, wherein each of the first tool element and the second tool element extends distally away from the shank in a length direction and defines a tool element axis along the length direction.

4. The medical instrument according to claim 3, wherein the first plate is arranged symmetrically relative to the tool element axis of the first tool element, and the second plate is arranged symmetrically relative to the tool element axis of the second tool element.

5. The medical instrument according to claim 3, wherein:
   the first tool element has a first tool element thickness and the first plate has a first plate thickness,
   the first tool element thickness and the first plate thickness are each measured perpendicularly to the tool element axis of the first tool element, and
   the first plate thickness is less than half of the first tool element thickness.

6. The medical instrument according to claim 3, wherein:
   the second tool element has a second tool element thickness and the second plate has a second plate thickness,
   the second tool element thickness and the second plate thickness are each measured perpendicularly to the tool element axis of the second tool element, and
   the second plate thickness is less than half of the second tool element thickness.

7. The medical instrument according to claim 1, wherein:
   the first plate projects distally from the gripping tool,
   the second plate projects distally from the gripping tool,
   the first plate and the second plate are configured for insertion between two tissue layers when the first tool element is in the closed position, and
   the first plate and the second plate are configured to separate the two tissue layers when the first tool element is pivoted to the open position.

8. The medical instrument according to claim 1, wherein each inwardly tapered plate section forms a concave face.

9. The medical instrument according to claim 8, wherein the protuberances define distal ends of the concave faces.

10. The medical instrument according to claim 1, wherein the first plate has a curvature that conforms to a first U-shape.

11. The medical instrument according to claim 10, wherein the second plate has a curvature that conforms to a second U-shape.

12. The medical instrument according to claim 11, wherein the second U-shape of the second plate conforms to the first U-shape of the first plate.

13. The medical instrument according to claim 1, further comprising a cutting element that is advanceable between the first tool element and the second tool element to cut tissue when the first tool element and the second tool element are in the closed position.

14. The medical instrument according to claim 13, wherein the first clamping face defines a first slit and the second clamping face defines a second slit, the first slit and the second slit configured to guide advancement of the cutting element to cut tissue when the first tool element and the second tool element are in the closed position.

15. The medical instrument according to claim 1, wherein the first plate and the second plate extend parallel to one another when the first tool element is in the closed position.

* * * * *